US009999953B2

(12) United States Patent
Masakawa (10) Patent No.: US 9,999,953 B2
(45) Date of Patent: Jun. 19, 2018

(54) MIST REMOVAL SYSTEM AND MIST REMOVAL METHOD

(71) Applicant: FANUC CORPORATION, Minamitsuru-gun, Yamanashi (JP)

(72) Inventor: Takashi Masakawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 97 days.

(21) Appl. No.: 15/343,781

(22) Filed: Nov. 4, 2016

(65) Prior Publication Data
US 2017/0129065 A1    May 11, 2017

(30) Foreign Application Priority Data

Nov. 11, 2015   (JP) ................................. 2015-221033

(51) Int. Cl.
*B23Q 17/00* (2006.01)
*G05B 19/4065* (2006.01)
*B08B 15/00* (2006.01)
*B08B 17/00* (2006.01)

(52) U.S. Cl.
CPC ............ *B23Q 17/007* (2013.01); *B08B 15/00* (2013.01); *G05B 19/4065* (2013.01); *B08B 17/00* (2013.01); *G05B 2219/50276* (2013.01)

(58) Field of Classification Search
None
See application file for complete search history.

(56) References Cited

FOREIGN PATENT DOCUMENTS

| JP | 2009279496 A | 12/2009 |
|----|--------------|---------|
| JP | 2010014304 A | 1/2010 |
| JP | 2013056379 A | 3/2013 |
| JP | 2014-161759 A | 9/2014 |
| JP | 2015093367 A | 5/2015 |

OTHER PUBLICATIONS

Notification of Reasons for Refusal for Japanese Application No. 2015-221033, dated Aug. 24, 2017, including English language translation, 7 pages.

*Primary Examiner* — Carlos Ortiz Rodriguez
(74) *Attorney, Agent, or Firm* — RatnerPrestia (57) ABSTRACT

A mist removal system includes an observation unit that observes a situation related to the mist concentration in a factory, a first mist countermeasure unit that reduces the mist concentration in a machine tool, a second mist countermeasure unit that reduces the mist concentration in the factory, and a control unit. The control unit controls observation by the observation unit and interlocking operation of the first mist countermeasure unit and the second mist countermeasure unit. Furthermore, the control unit determines the control details of interlocking operation of the first and second mist countermeasure units based on the observation results of the mist concentration obtained by the observation unit.

9 Claims, 6 Drawing Sheets

FIG.2A

| | WHETHER MEASURED VALUE OR ESTIMATED VALUE IS GREATER THAN SPECIFIED VALUE (TARGET VALUE) | | | | |
|---|---|---|---|---|---|
| | CONSIDERABLY GREATER | GREATER | EQUAL TO | A BIT SMALLER | SMALLER |
| CONCENTRATION METER | a | b | c | d | e |
| CONCENTRATION ESTIMATING DEVICE | f | g | h | i | j |
| MIST LEAKAGE AMOUNT ESTIMATING DEVICE | k | l | m | n | o |

FIG.2B

| | WHETHER THE DOOR OR THE LIKE IS LOCATED BETWEEN CONCENTRATION OBSERVED REGION AND MIST GENERATION SOURCE | OPEN AT ALMOST ALL TIMES | REPEATEDLY OPENED AND CLOSED | CLOSED AT ALMOST ALL TIMES |
|---|---|---|---|---|
| DOOR OPEN/ CLOSED STATE | LOCATED | A | B | C |
| | NOT LOCATED | D | E | F |
| WINDOW OPEN/ CLOSED STATE | LOCATED | G | H | I |
| | NOT LOCATED | J | K | L |
| SHUTTER OPEN/ CLOSED STATE | LOCATED | M | N | O |
| | NOT LOCATED | P | Q | R |

FIG.3

| | | SUM TOTAL OF POINTS OBTAINED FROM OBSERVATION RESULTS | | | | |
|---|---|---|---|---|---|---|
| | | 0 | 1~2 | 3~5 | 6~9 | 10 OR GREATER |
| MIST COLLECTOR | | TURN OFF IMMEDIATELY | OPERATE, AT LOW SETTING, ONLY WHAT IS CLOSEST TO OBSERVED REGION OR MIST GENERATION SOURCE | OPERATE, AT HIGH SETTING, WHAT IS CLOSEST TO OBSERVED REGION OR MIST GENERATION SOURCE AND/OR OPERATE, AT LOW SETTING, WHAT IS LOCATED BETWEEN OBSERVED REGION AND MIST GENERATION SOURCE | OPERATE, AT HIGH SETTING, WHAT IS CLOSEST TO OBSERVED REGION OR MIST GENERATION SOURCE AND/OR OPERATE, AT HIGH SETTING, WHAT IS LOCATED BETWEEN OBSERVED REGION AND MIST GENERATION SOURCE AND/OR OPERATE THE OTHERS AT LOW SETTING | OPERATE ALL OF THEM AT HIGH SETTING |
| VENTILATION DEVICE OF CONTROL PANEL | | | | | | |
| AIR-CONDITIONING FACILITY OF FACTORY | | | | | | |
| CUTTING FLUID DISCHARGE STOP DEVICE | | NOT STOP DISCHARGE | NOT STOP DISCHARGE | NOT STOP DISCHARGE | STOP DISCHARGE | STOP DISCHARGE |
| DOOR | | PERFORM NO SPECIAL CONTROL | FOR ONLY WHAT IS CLOSEST TO OBSERVED REGION OR MIST GENERATION SOURCE, EXTEND TIME THAT ELAPSES BEFORE IT IS CLOSED AFTER IT IS TEMPORARILY OPENED | FOR ALL THAT IS LOCATED BETWEEN OBSERVED REGION AND MIST GENERATION SOURCE, EXTEND TIME THAT ELAPSES BEFORE IT IS CLOSED AFTER IT IS TEMPORARILY OPENED OR OPEN IT AT ALL TIMES | OPEN WHAT IS CLOSEST TO OBSERVED REGION OR MIST GENERATION SOURCE AT ALL TIMES AND/OR, FOR THE OTHERS, EXTEND TIME THAT ELAPSES BEFORE THEY ARE CLOSED AFTER THEY ARE TEMPORARILY OPENED OR OPEN THEM AT ALL TIMES | OPEN ALL OF THEM AT ALL TIMES |
| WINDOW | | | | | | |
| SHUTTER | | | | | | |

FIG.6

MIST REMOVAL SYSTEM AND MIST REMOVAL METHOD

BACKGROUND OF THE INVENTION

1. Field of the Invention

The present invention relates to a mist removal system and a mist removal method that reduce the mist concentration in a machine tool and the mist concentration in a factory in which the machine tool is installed.

2. Description of the Related Art

In working using a cutting fluid, a situation in which a machine tool and a factory are contaminated by a mist (particles derived from the discharged cutting fluid scattered in the air by, for example, being raised by a rotary tool) generated at the time of working cannot be avoided. The mist entering a control panel and a mechanical unit of the machine tool will lead to a mechanical breakdown and, in addition thereto, contamination of the air in the factory may cause a health hazard and accidents caused by poor visibility during work.

Thus, in the past, a technology for mist suppression and removal (hereinafter referred to as a mist countermeasure unit), such as a mist collector which is a device that collects the generated mist by sucking the air in the working area of a machine tool, for example, has been known and described in Japanese Patent Application Laid-Open No. 2014-161759, for example.

In the past, a machine tool and factory facilities (such as an air conditioner) have been individually controlled. The mist countermeasure unit disclosed in Japanese Patent Application Laid-Open No. 2014-161759 described above is independently subjected to ON/OFF-only control under the machine tool to which the mist countermeasure unit is attached, which causes a problem of inefficient mist removal and a lot of waste in power consumption depending on the situation.

For example, the mist collector is generally used in continuous operation, which may cause the mist collector to continue idle running even in a period in which a new mist is not generated while the machine tool is stopped and wastefully continue consuming electric power.

Moreover, considering a case in which a reduction in the concentration of a mist filling the inside of the factory is desired, since the mist concentration varies from hour to hour depending on, for example, the air conditioning state of the factory in addition to the number of machine tools operating in the factory and the working details of each machine tool (in general, a mist is easily generated during hard working), it is inefficient to use only one mist countermeasure unit; however, if all the mist countermeasure units are fully operated continuously with no consideration given to the above-described situation in the factory, the electric power is wastefully consumed.

SUMMARY OF THE INVENTION

An object of the present invention is accordingly to provide a mist removal system that can efficiently suppress and remove a mist.

The present invention solves the above-described problems by providing a unit that coordinately controls a plurality of mist countermeasure units (for example, a mist collector and an air conditioner of a factory).

A mist removal system according to the present invention is configured so as to observe the mist concentration in an observed region in a factory in which at least one machine tool, which is a mist generation source, is installed and reduce the mist concentration and includes: at least one observation unit that observes a situation related to the mist concentration in an arbitrary location in the factory; at least one machine tool mist countermeasure unit that reduces the mist concentration in the machine tool; at least one factory mist countermeasure unit that reduces the mist concentration in the factory; and a control unit that performs control of observation by the observation unit and control of interlocking operation of the machine tool mist countermeasure unit and the factory mist countermeasure unit. In addition, the control unit is configured so as to determine the control details of interlocking operation of the machine tool mist countermeasure unit and the factory mist countermeasure unit based on the observation results of a mist concentration obtained by the observation unit and reduce the mist concentration in the observed region by controlling the machine tool mist countermeasure unit and the factory mist countermeasure unit based on the control details of the interlocking operation thus determined.

The control unit may be configured so as to store in advance information on the positional relationship between the position of the machine tool, the position of the observed region, a position of the observation unit, the position of the machine tool mist countermeasure unit, and the position of the factory mist countermeasure unit and identify the observation unit which is used in determining the control details of the interlocking operation for reducing the mist concentration in the observed region and identify the machine tool mist countermeasure unit and the factory mist countermeasure unit which are set as an object to be controlled by control operation of the interlocking operation, based on the stored positional relationship.

The observation unit may include a machine tool observation unit that observes a situation related to the mist concentration in the machine tool and a factory observation unit that observes a situation related to the mist concentration in the observed region.

The machine tool observation unit may include at least one of a concentration meter that measures a mist concentration, a concentration estimating device that estimates a mist concentration based on the operation status of the machine tool, and a mist leakage amount estimating device that estimates the amount of a mist leaking from the machine tool.

The factory observation unit may include at least one of a concentration meter that measures a mist concentration, a concentration estimating device that estimates a mist concentration based on the facilities operation status in the factory, a door open/closed status detecting device that detects the open/closed status of a door which is installed in the factory, a window open/closed status detecting device that detects the open/closed status of a window which is installed in the factory, and a carry-in entrance shutter open/closed status detecting device that detects the open/closed status of a carry-in entrance shutter which is installed in the factory.

The control unit may determine the control details of the interlocking operation based on the sum total of points recorded based on the observation results obtained by the observation unit.

The mist removal system may further include a recording unit that records the observation results obtained by the observation unit and the control details of the interlocking operation determined by the control unit.

The mist removal system may further include a monitoring unit that monitors the observation results obtained by the observation unit and the control details of the interlocking operation determined by the control unit.

Furthermore, a mist removal method according to the present invention is a mist removal method in a mist removal system that observes the mist concentration in an observed region in a factory in which at least one machine tool, which is a mist generation source, is installed and reduces the mist concentration, the machine tool includes at least one machine tool mist countermeasure unit that reduces the mist concentration in the machine tool, and, in the factory, at least one factory mist countermeasure unit that reduces the mist concentration in the factory is installed. In addition, the mist removal method includes: a step of observing a situation related to the mist concentration in an arbitrary location in the factory by at least one observation unit; a step of determining the control details of interlocking operation of the machine tool mist countermeasure unit and the factory mist countermeasure unit based on the observation results of a mist concentration obtained by the observation unit; and a step of reducing the mist concentration in the observed region by controlling the machine tool mist countermeasure unit and the factory mist countermeasure unit based on the control details of the interlocking operation thus determined.

According to the present invention, since a plurality of mist countermeasure units are coordinately controlled, it is possible to observe and control the mist countermeasure units in the whole of a factory in a unified manner, which makes it possible to suppress and remove a mist efficiently. Moreover, since there is no need to provide individual anti-mist measures unit with excess capacities and it is possible to curb wasteful power consumption which is required to suppress and remove a mist, it is possible to cut down the cost of introduction of those mist countermeasure units and the running cost thereof.

BRIEF DESCRIPTION OF THE DRAWINGS

The forgoing and other objects and feature of the invention will be apparent from the following description of preferred embodiments of the invention with reference to the accompanying drawings, in which:

FIG. 3 is a diagram depicting an example of interlocking operation control of a factory mist countermeasure unit and a machine tool mist countermeasure unit in the removal system depicted in FIG. 1;

DETAILED DESCRIPTION OF THE PREFERRED EMBODIMENTS

The present invention solves the problems of the above-described prior art technique by providing a mist removal system provided with a control unit that observes the mist concentration in a region in which removal of a mist is desired to prevent harmful effects on a machine and an operator, such as the inside of a control panel of a machine tool and the space on an office floor of a factory, and coordinately controls a plurality of mist countermeasure units (for example, a mist collector and an air conditioner of the factory) based on the observation results thus obtained.

The mist removal system of the present invention performs, as an example, control by which the mist removal system adjusts the air conditioner in the factory while reducing the mist concentration in the machine tool, which is a mist generation source, by the mist collector and coordinately combines ON/OFF of the mist collector and the air conditioner in an efficient manner in order to reduce the mist concentration in the factory. For example, the mist removal system turns off the air conditioner of the whole of the factory immediately after the start of working because the air conditioner is not necessary at that time and turns off the mist collector after working is finished because the mist collector is not necessary at that time either.

The mist removal system of the present invention observes mist concentration in an arbitrary location in a factory (for example, mist concentration in a space on an office floor of the factory or inside of a control panel of a machine tool) and controls a mist countermeasure unit (for example, a mist collector) of the machine tool and a mist countermeasure unit (for example, an air conditioner) of the factory in accordance with the observation results.

Figure 1:
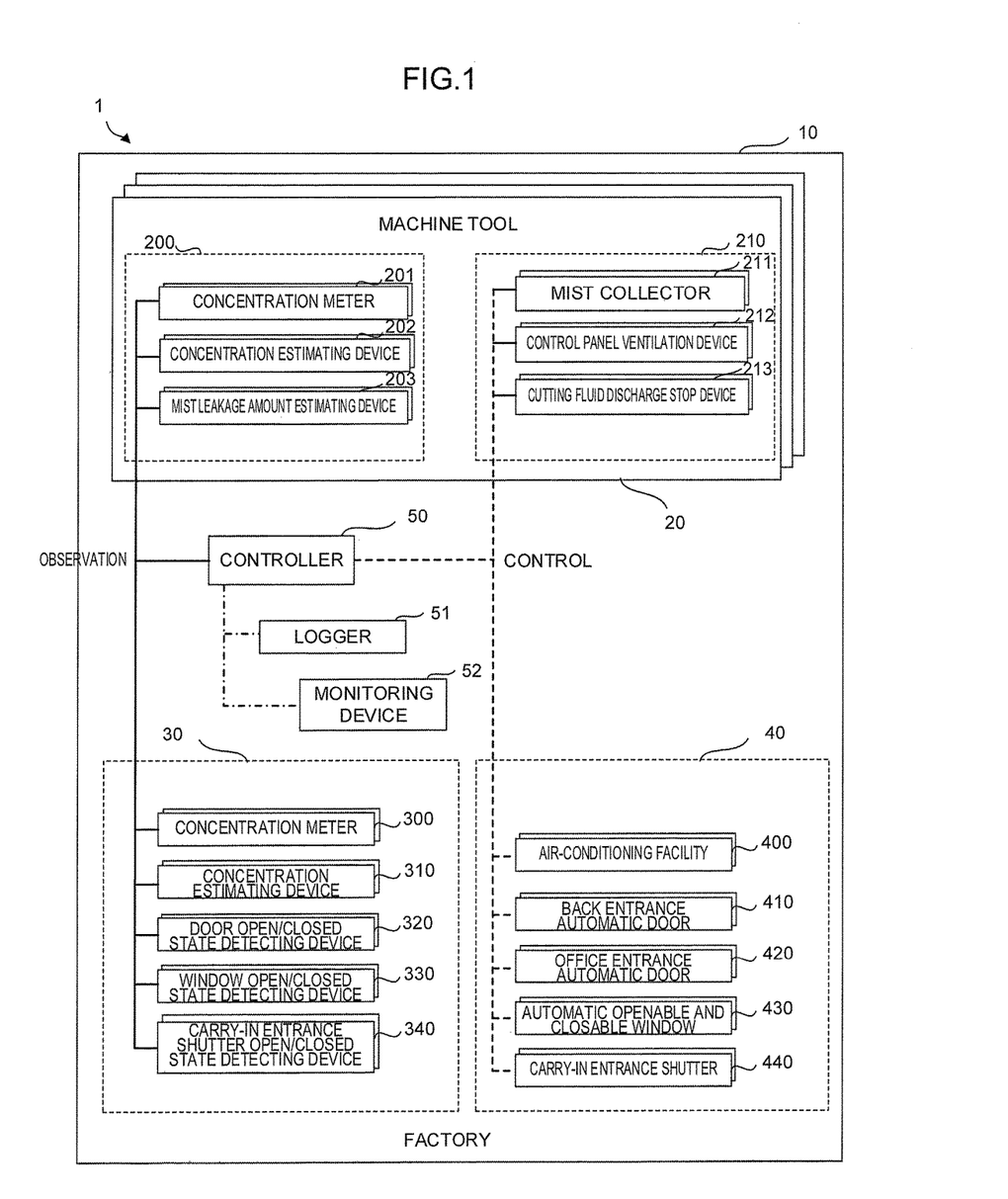
FIG. 1 is a schematic configuration diagram of a mist removal system according to one embodiment of the present invention.

FIG. 1 is a schematic configuration diagram of a mist removal system according to one embodiment of the present invention.

A mist removal system 1 of this embodiment includes a machine tool 20, a factory observation unit 30, a factory mist countermeasure unit 40, a controller 50, a logger 51, and a monitoring device 52, which are placed in a factory 10.

The machine tool 20 is formed of a machine tool observation unit 200 that observes a mist which is generated in the machine tool 20 and a machine tool mist countermeasure unit 210 serving to reduce the mist concentration in or near the machine tool 20. The machine tool observation unit 200 includes a concentration meter 201 that measures the concentration of the mist in the machine tool 20, a concentration estimating device 202 that estimates the concentration of the mist in the machine tool 20 based on the information on the operation status of the machine tool 20, and a mist leakage amount estimating device 203 that estimates the amount of mist leaked to the outside of the machine tool 20 by measuring the quantity of air which leaks to the outside of a working area through, for example, joints in a metal sheet of the machine tool 20. On the other hand, the machine tool mist countermeasure unit 210 includes a mist collector 211 that collects the generated mist by sucking the air in the working area of the machine tool 20, a control panel ventilation device 212 that ventilates the inside of a control panel, and a cutting fluid discharge stop device 213 that stops the discharge of a cutting fluid.

Incidentally, the mist removal system 1 may include a plurality of machine tools 20. Furthermore, the machine tool 20 may include a plurality of machine tool observation units 200 and a plurality of machine tool mist countermeasure units 210.

The factory observation unit 30 includes a concentration meter 300 that measures the concentration of a mist in the air in the factory 10, a concentration estimating device 310 that estimates the concentration of a mist in the air based on the information on the operation status of each device in the factory 10, a door open/closed state detecting device 320 that detects the open/closed state of each door which is placed in the factory 10, a window open/closed state detecting device 330 that detects the open/closed state of each window which is placed in the factory 10, and a carry-in entrance shutter open/closed state detecting device 340 that detects the open/closed state of each carry-in entrance shutter which is placed in the factory 10.

Moreover, the factory mist countermeasure unit 40 is a function unit that serves to reduce the observed mist concentration when it is activated and includes, as an example, an air-conditioning facility 400 that performs an adjustment of the temperature of the air in the factory 10 and the ventilation of the air, a back entrance automatic door 410, an office entrance automatic door 420, an automatic openable and closable window 430, and a carry-in entrance shutter 440 whose open/close controls are possible, and so forth.

Incidentally, the mist removal system 1 may include a plurality of factory observation units 30 and a plurality of factory mist countermeasure units 40.

The controller 50

(1) observes the concentration of a mist and the open/closed state of the door and the window in an arbitrary observed region in the factory (for example, a region on the office floor of the factory) by the factory observation unit 30, and (2) observes the state in the control panel of the machine tool 20 by the machine tool observation unit 200 provided in each machine tool 20, and (3) based on the information collected by these observations, coordinately controls the factory mist countermeasure unit 40 and the machine tool mist countermeasure unit 210.

The controller 50 stores identification information by which each observed region in the factory which is an object to be observed, each mist generation source of the machine tool 20, each observation unit (the factory observation unit 30, the machine tool observation unit 200), and each mist countermeasure unit (the factory mist countermeasure unit 40, the machine tool mist countermeasure unit 210) can be identified and positional relationship information indicating the relationship between the position of each observed region, the position of each mist generation source, the position of each observation unit, and the position of each mist countermeasure unit.

As this positional relationship information, for example, in addition to the coordinate positions of the observed region and the mist generation source in the factory, as for each observation unit and each mist countermeasure unit, it is necessary simply to store only the coordinate positions thereof. In that case, the positional relationship therebetween is grasped based on the distance which is calculated from each coordinate position. Furthermore, more simply, the positional relationship information may be created and stored as information by which the positional relationship between each observed region and each mist generation source, each observation unit, and each mist countermeasure unit can be grasped. In that case, the positional relationship information may be stored as information by which the positional relationship between an observed region, a mist generation source, an observation unit, and a mist countermeasure unit having a close relationship therebetween, such as "(for example, a mist generation source) is located closest to an observed region A", "(for example, a mist countermeasure unit) is located closest to a mist generation source A", "(for example, a mist countermeasure unit) is located between the observed region A and the mist generation source A", and "others".

The controller 50 makes a judgment based on the information obtained by observing the factory observation unit 30 and the machine tool observation unit 200 and determines control of the factory mist countermeasure unit 40 and the machine tool mist countermeasure unit 210 based on the judgment results. As an example of a method of making a judgment based on the information obtained by observation, point rating system is available.

Figure 2A:
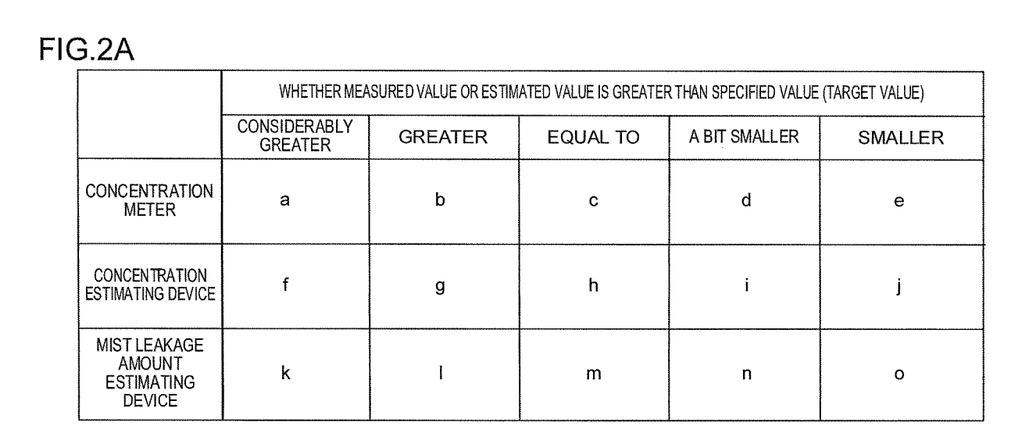
FIGS. 2A and 2B are tables, each depicting an example of a table of points based on the observation results obtained from a factory observation unit and a machine tool observation unit of FIG. 1.
Figure 2B:
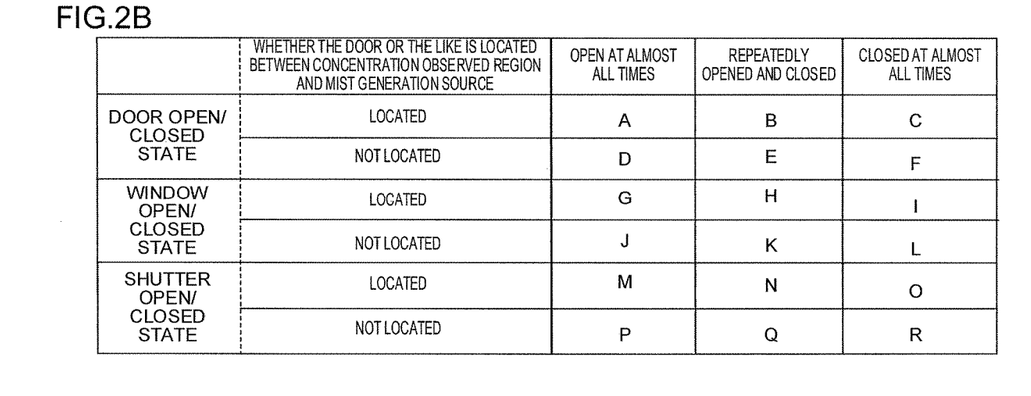

FIGS. 2A and 2B are tables, each depicting an example of a table of points based on the observation results obtained from the factory observation unit 30 and the machine tool observation unit 200 of FIG. 1.

In the tables of FIGS. 2A and 2B, a row indicates each observation unit and a column indicates a range obtained by dividing the observation results of each observation unit by using previously set threshold values. Moreover, in each field in which an alphabet is written in the tables depicted in FIGS. 2A and 2B, an arbitrary numeral (point) is entered. This point is set to a suitable value in advance by a designer of the system.

For example, if it is judged that the mist concentration in the air measured by the concentration meter 201 as the observation unit is a rather large value (for example, 80% or higher), as depicted in FIG. 2A, the controller 50 records a point a for the observation unit (the concentration meter 201). Moreover, if it is judged that the door is closed at almost all times (once per hour or fewer) based on the open/close frequency of the door within the latest one hour calculated from the history of the door open/closed state obtained by the door open/closed state detecting device 320 as the observation unit, as depicted in FIG. 2B, the controller 50 records a point C for the observation unit (the door open/closed state detecting device 320).

At the intervals of a previously set predetermined period or when a condition that, for example, any one of the observation units detects a great change (for example, the mist concentration in a region on the office floor of the factory exceeds a predetermined threshold value) is satisfied, the controller 50 performs recording of the points based on the observation results obtained from the above-described observation units 30 and 200 and calculates the sum total of points obtained by summing up the points recorded for each observed region. Then, the controller 50 determines the control operation of the factory mist countermeasure unit 40 and the machine tool mist countermeasure unit 210 based on the sum total of points obtained from the observation results and controls the mist countermeasure units 40 and 210 based on the control operation thus determined. When the controller 50 calculates the sum total of points, for example, the controller 50 may specify, for each observed region, the observation units 30 and 200 within a predetermined range that affects the observed region based on the positional relationship information of the observation units 30 and 200 and calculate, as the sum total of points from the observation results in the observed region, the points obtained by summing up the points recorded from the observation results obtained by the specified observation unit.

FIG. 3 is a table depicting an example of interlocking operation control of the factory mist countermeasure unit 40 and the machine tool mist countermeasure unit 210 based on the sum total of points.

In the table of FIG. 3, a row indicates each mist countermeasure unit (the factory mist countermeasure unit 40, the machine tool mist countermeasure unit 210) and a column indicates the sum total of points obtained from the observation results. In each cell, interlocking operation control of the mist countermeasure units is defined.

The interlocking operation control of the mist countermeasure units is defined as control operation that reduces the mist concentration in the observed region to a target value or less. For example, when interlocking operation control of the mist countermeasure units based on the table of FIG. 3 is performed, if the sum total of points obtained from the observation results in a predetermined observed region is 2 points, interlocking operation control is performed by which the mist collector, the control panel ventilation device, and the air-conditioning facility, which are closest to that observed region, are operated at low setting and, at the same time, the open time of the door, the window, and the carry-in entrance shutter, which are closest to that observed region, is extended. Incidentally, as for the details of the interlocking operation control of the mist countermeasure units corresponding to the sum total of points, the designer of the system simply has to perform an experiment or the like in advance and set appropriate interlocking operation control that can efficiently reduce the mist concentration in the situation of each sum total of points.

Back in FIG. 1, the logger 51 in the mist removal system 1 is used to record the mist concentration in each observed region and the transition of power consumption of the entire mist removal system 1 based on the observation results which the controller 50 obtained by controlling the observation units (the factory observation unit 30 and the machine tool observation unit 200). Moreover, the monitoring device 52 can be used to monitor the mist concentration in the observed region and the transition of power consumption of the entire mist removal system 1.

Figure 4:
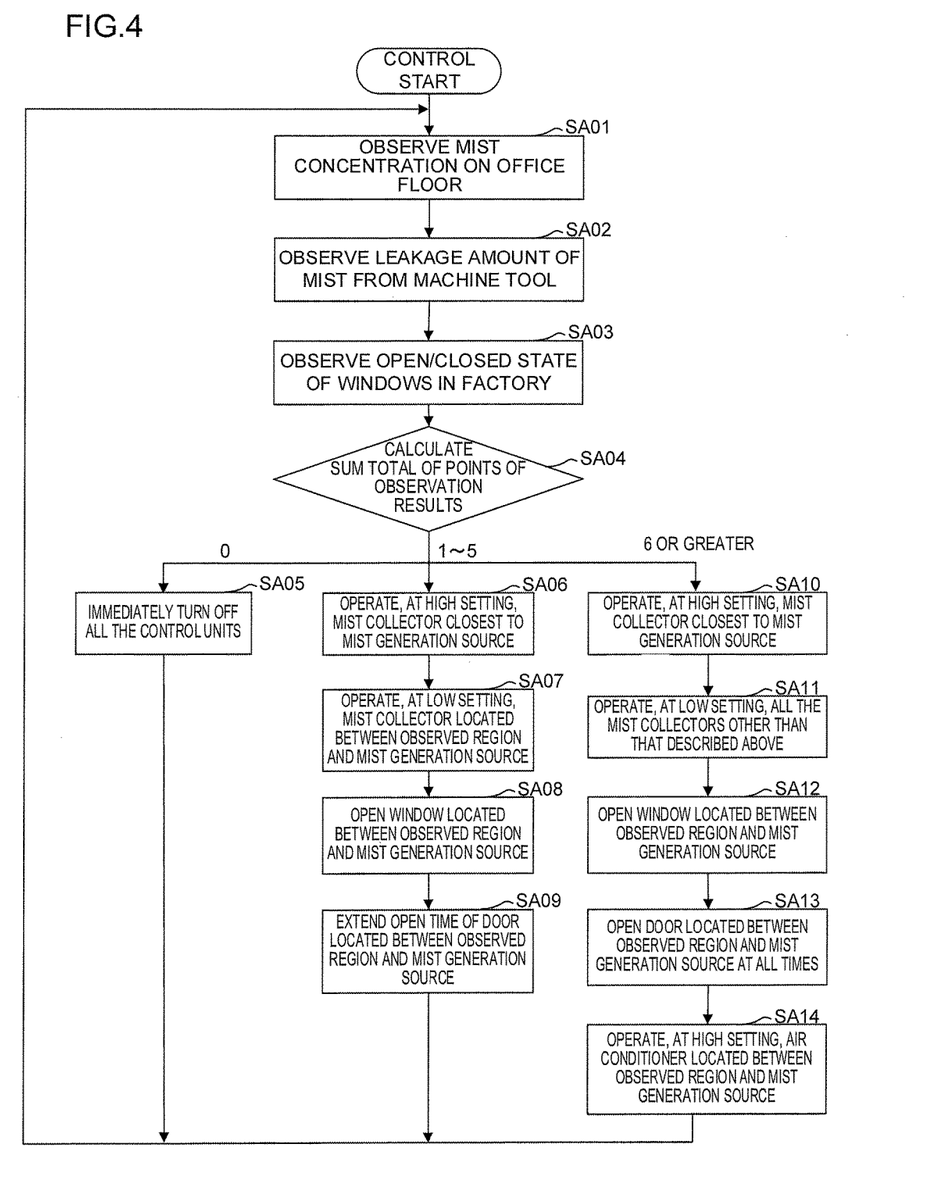
FIG. 4 is a flowchart of the flow of processing that reduces the mist concentration on an office floor of a factory, the processing being performed by a controller in the removal system depicted in FIG. 1.

FIG. 4 is a flowchart showing the flow of processing that reduces the mist concentration on the office floor of the factory, the processing being performed by the controller 50 in the removal system 1 depicted in FIG. 1. The controller 50 performs interlocking operation control of the factory mist countermeasure unit 40 and the machine tool mist countermeasure unit 210 in order to reduce the mist concentration on the office floor of the factory. Incidentally, in the processing described in this flowchart, for the sake of simplification of explanations, it is assumed that only one machine tool is installed in the factory 10. Hereinafter, explanations will be given in accordance with the steps.

[Step SA01] The controller 50 observes the mist concentration by controlling the factory observation unit 30 (the concentration meter 300, the concentration estimating device 310, and the like) installed on the office floor of the factory 10 and records the point based on the observation results. As an example, if the mist concentration is smaller than a previously set target value of a mist concentration, 0 point is recorded; if the mist concentration is greater than or equal to the target value but smaller than twice the target value, 2 points are recorded; if the mist concentration is greater than or equal to twice the target value, 3 points are recorded.

[Step SA02] The controller 50 observes the leakage amount of mist leaking from the machine tool 20 by controlling the machine tool observation unit 200 (the mist leakage amount estimating device 203 and the like) installed in the machine tool 20 and records the point based on the observation results. As an example, if the mist leakage amount is smaller than a previously set target value of a mist leakage amount, 0 point is recorded; if the mist leakage amount is greater than or equal to the target value, 1 point is recorded.

[Step SA03] The controller 50 observes the open/closed state of the windows within the latest one hour by controlling the factory observation unit 30 (the window open/closed state detecting device 330) for the windows installed near the office floor of the factory 10 and records the point based on the observation results. As an example, if all the windows near the office floor are open, 0 point is recorded; if the window closest to the machine tool 20 which is a mist generation source is opened and closed once or more than once per hour, 1 point is recorded; if the window closest to the machine tool 20 which is the mist generation source is closed at all times, 2 points are recorded.

[Step SA04] The controller 50 calculates the sum total of points obtained by summing the points recorded in steps SA01 to SA03. The processing proceeds to step SA05 if the calculated sum total of points is 0 and proceeds to step SA06 if the sum total of points is any one of 1 to 5. Moreover, the processing proceeds to step SA10 if the sum total of points is 6 or greater.

[Step SA05] The controller 50 immediately turns off the operation of all the mist countermeasure units (the machine tool mist countermeasure unit 210 and the factory mist countermeasure unit 40), such as the mist collector 211 and the air-conditioning facility 400, which actively reduce the mist concentration. After the completion of the control operation, the processing returns to step SA01.

[Step SA06] The controller 50 operates, at high setting, the mist collector 211 provided in the machine tool 20 which is a mist generation source, or the mist collector 211 located closest to the machine tool 20.

[Step SA07] The controller 50 operates, at low setting, the mist collector 211 located between the office floor which is an observed region and the machine tool 20 which is the mist generation source.

[Step SA08] The controller 50 opens the automatic openable and closable window 430 located between the office floor which is the observed region and the machine tool 20 which is the mist generation source.

[Step SA09] The controller 50 extends the open time (the time from when a door is opened till when the door is automatically closed) of the back entrance automatic door 410, the office entrance automatic door 420, and the carry-in entrance shutter 440, which are located between the office floor which is the observed region and the machine tool 20 which is the mist generation source. After the completion of such an operation to extend the open time of the door or the shutter, the processing returns to step SA01.

[Step SA10] The controller 50 operates, at high setting, the mist collector 211 provided in the machine tool 20 which is the mist generation source, or the mist collector located closest to the machine tool 20.

[Step SA11] The controller 50 operates, at low setting, the mist collector 211 other than the mist collector 211 operated at high setting in step SA10.

[Step SA12] The controller 50 opens the automatic openable and closable window 430 located between the office floor which is the observed region and the machine tool 20 which is the mist generation source.

[Step SA13] The controller 50 opens, at all times, each automatic door located between the office floor which is the observed region and the machine tool 20 which is the mist generation source.

[Step SA14] The controller 50 operates, at high setting, the air-conditioning facility 400 located between the office floor which is the observed region and the machine tool 20 which is the mist generation source.

Figure 5:
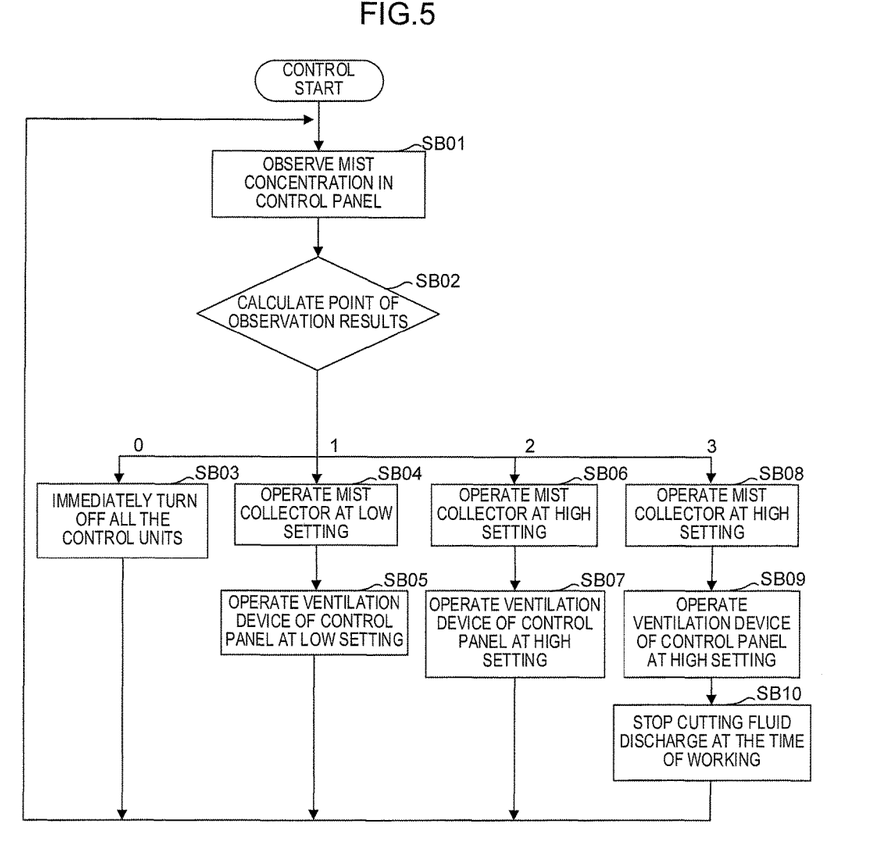
FIG. 5 is a flowchart of the flow of processing that reduces the mist concentration in a control panel of a machine tool, the processing being performed by the controller in the removal system depicted in FIG. 1.

FIG. 5 is a flowchart showing the flow of processing that reduces the mist concentration in the control panel of the machine tool 20, the processing being performed by the controller 50 in the removal system 1 depicted in FIG. 1. The controller 50 performs interlocking operation control of the machine tool mist countermeasure unit 210 and the factory mist countermeasure unit 40 in order to reduce the mist concentration in the control panel of the machine tool 20. Hereinafter, explanations will be given in accordance with the steps.

[Step SB01] The controller 50 observes the mist concentration by controlling the machine tool observation unit 200 (the concentration meter 201, the concentration estimating device 202, and the like) placed in the control panel of the machine tool 20 and records the point based on the observation results. As an example, if the mist concentration is smaller than a previously set target value of a mist concentration, 0 point is recorded; if the mist concentration is greater than or equal to the target value but smaller than twice the target value, 1 point is recorded; if the mist concentration is greater than or equal to twice the target value but smaller than three-times the target value, 2 points are recorded; if the mist concentration is greater than or equal to three-times the target value, 3 points are recorded.

[Step SB02] The processing proceeds to step SB03 if the point recorded in step SB01 is 0, proceeds to step SB04 if the point is 1, proceeds to step SB06 if the point is 2, and proceeds to step SB08 if the point is 3.

[Step SB03] The controller 50 immediately turns off the operation of all the mist countermeasure units (the machine tool mist countermeasure unit 210 and the factory mist countermeasure unit 40), such as the mist collector 211 which is placed in the control panel of the machine tool 20, which actively reduce the mist concentration and then the processing returns to step SB01.

[Step SB04] The controller 50 operates, at low setting, the mist collector 211 placed in the control panel of the machine tool 20.

[Step SB05] The controller 50 operates, at low setting, the control panel ventilation device 212 placed in the control panel of the machine tool 20 and then processing returns to step SB01.

[Step SB06] The controller 50 operates, at high setting, the mist collector 211 placed in the control panel of the machine tool 20.

[Step SB07] The controller 50 operates, at high setting, the control panel ventilation device 212 placed in the control panel of the machine tool 20 and then the processing returns to step SB01.

[Step SB08] The controller 50 operates, at high setting, the mist collector 211 placed in the control panel of the machine tool 20.

[Step SB09] The controller 50 operates, at high setting, the control panel ventilation device 212 placed in the control panel of the machine tool 20.

[Step SB10] The controller 50 stops cutting fluid discharge at the time of working by controlling the cutting fluid discharge stop device 213 provided in the machine tool 20 and then the processing returns to step SB01.

Figure 6:
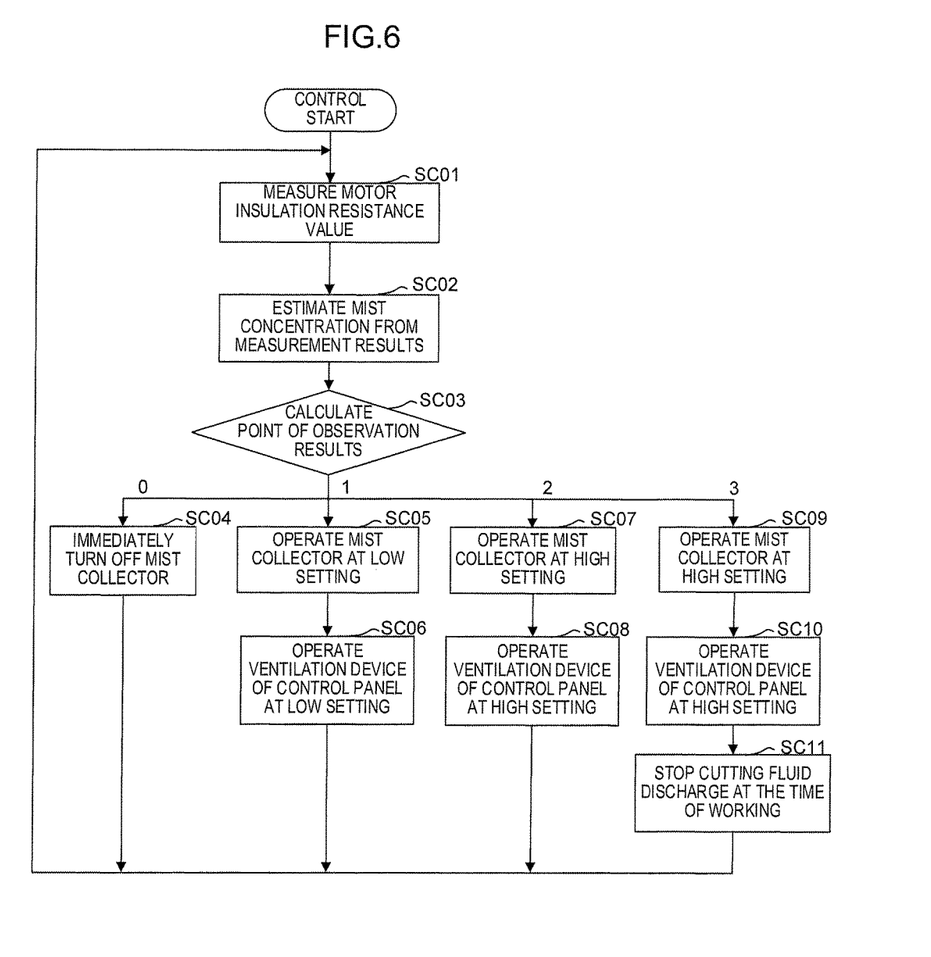
FIG. 6 is a flowchart of the flow of processing that reduces the mist concentration near a motor of the machine tool, the processing being performed by the controller in the removal system depicted in FIG. 1.

FIG. 6 is a flowchart showing the flow of processing that reduces the mist concentration near a motor of the machine tool 20, the processing being performed by the controller 50 in the removal system 1 depicted in FIG. 1. The controller 50 performs interlocking operation control of the machine tool mist countermeasure unit 210 and the factory mist countermeasure unit 40 in order to reduce the mist concentration near the motor of the machine tool 20. Hereinafter, explanations will be given in accordance with the steps.

[Step SC01] The controller 50 measures the motor insulation resistance value of the motor of the machine tool 20.

[Step SC02] The controller 50 guesses the operation status of the machine tool 20 based on the measurement results in step SC01 and estimates the mist concentration near the motor of the machine tool 20 based on the results of the guess. Then, the controller 50 records the point based on the estimation results. As an example, if the estimated mist concentration is smaller than a previously set target value of a mist concentration, 0 point is recorded; if the estimated mist concentration is greater than or equal to the target value but smaller than twice the target value, 1 point is recorded, if the estimated mist concentration is greater than or equal to twice the target value but smaller than three-times the target value, 2 points are recorded; if the estimated mist concentration is greater than or equal to three-times the target value, 3 points are recorded.

[Step SC03] The processing proceeds to step SC04 if the point recorded in step SC02 is 0, proceeds to step SC05 if the point is 1, proceeds to step SC07 if the point is 2, and proceeds to step SC09 if the point is 3.

[Step SC04] The controller 50 immediately turns off the operation of all the mist countermeasure units (the machine tool mist countermeasure unit 210 and the factory mist countermeasure unit 40), such as the mist collector 211 which is placed in the machine tool 20, which actively reduce the mist concentration, and then the processing returns to step SC01.

[Step SC05] The controller 50 operates, at low setting, the mist collector 211 which is placed in the machine tool 20.

[Step SC06] The controller 50 operates, at low setting, the control panel ventilation device 212 which is placed in the control panel of the machine tool 20 and then the processing returns to step SC01.

[Step SC07] The controller 50 operates, at high setting, the mist collector 211 which is placed in the machine tool 20.

[Step SC08] The controller 50 operates, at high setting, the control panel ventilation device 212 which is placed in the control panel of the machine tool 20 and then the processing returns to step SC01.

[Step SC09] The controller 50 operates, at high setting, the mist collector 211 which is placed in the machine tool 20.

[Step SC10] The controller 50 operates, at high setting, the control panel ventilation device 212 which is placed in the control panel of the machine tool 20.

[Step SC11] The controller 50 stops cutting fluid discharge at the time of working by controlling the cutting fluid discharge stop device 213 provided in the machine tool 20 and then the processing returns to step SC01.

In the mist removal system of this embodiment provided with the above-described configuration, since removal of a mist is performed by operating the mist countermeasure unit near the observed region or located between the observed region and the mist generation source if the mist concentration in the observed region is very high, there is no need to adopt a method with inefficiencies in power consumption, such as reducing a mist concentration quickly by fully operating all the mist countermeasure units at all times, and it is possible to stop the operation of (or perform weak operation of) the mist countermeasure unit in accordance with the observation results.

As a result, it is possible to perform control by which the mist collector which is effective only in ventilating the inside of the machine is stopped and only the air conditioner of the factory is operated after the mist concentration in the machine tool is lowered after the completion of working, for example, and efficient mist removal control such as preventing an increase in the mist concentration in the office by stopping the air conditioner that consumes a lot of power and shortening the open time of the automatic door at the entrance of the office instead if the mist concentration in the office is not that high.

While the embodiment of the present invention has been described, the present invention is not limited to the examples of the above-described embodiment and can be carried out in various modes by being changed and modified appropriately.

For example, in the above-described embodiment, the sum total of points is calculated by recording the points based on the observation results obtained by the observation units which are placed, for example, near the observed region and the control details of interlocking operation of the mist countermeasure units are determined based on the calculated sum total of points, but any determination method may be adopted as long as the method can rationally determine the control details of efficient interlocking operation of the mist countermeasure units based on the observation results obtained by the observation units. For example, the control details of interlocking operation of the mist countermeasure units may be determined by a judgment using a decision tree based on the observation results obtained by the observation units or a rule-based judgment.

Moreover, in the above-described embodiment, the example of control by which the mist concentration in one observed region is reduced has been described, but a configuration may be adopted in which a plurality of observed regions are observed in parallel and the control details of interlocking operation of the mist countermeasure units are comprehensively determined.

The invention claimed is:

1. A mist removal system that observes a mist concentration in an observed region in a factory in which at least one machine tool, which is a mist generation source, is installed and reduces the mist concentration, the mist removal system comprising:
   at least one observation unit that observes a situation related to a mist concentration in an arbitrary location in the factory;
   at least one machine tool mist countermeasure unit that reduces a mist concentration in the machine tool;
   at least one factory mist countermeasure unit that reduces a mist concentration in the factory; and
   a control unit that performs control of observation by the observation unit and control of interlocking operation of the machine tool mist countermeasure unit and the factory mist countermeasure unit, wherein
   the control unit is configured so as to determine control details of interlocking operation of the machine tool mist countermeasure unit and the factory mist countermeasure unit based on observation results of a mist concentration obtained by the observation unit and reduce the mist concentration in the observed region by controlling the machine tool mist countermeasure unit and the factory mist countermeasure unit based on the control details of the interlocking operation thus determined.

2. The mist removal system according to claim 1, wherein the control unit stores in advance information on a positional relationship between a position of the machine tool, a position of the observed region, a position of the observation unit, a position of the machine tool mist countermeasure unit, and a position of the factory mist countermeasure unit, and
   the control unit is configured so as to identify the observation unit which is used in determining the control details of the interlocking operation for reducing the mist concentration in the observed region and identify the machine tool mist countermeasure unit and the factory mist countermeasure unit which are set as an object to be controlled by control operation of the interlocking operation, based on the stored positional relationship.

3. The mist removal system according to claim 1, wherein the observation unit includes a machine tool observation unit that observes a situation related to the mist concentration in the machine tool and a factory observation unit that observes a situation related to the mist concentration in the observed region.

4. The mist removal system according to claim 3, wherein the machine tool observation unit includes at least one of a concentration meter that measures a mist concentration, a concentration estimating device that estimates a mist concentration based on an operation status of the machine tool, and a mist leakage amount estimating device that estimates an amount of a mist leaking from the machine tool.

5. The mist removal system according to claim 3, wherein the factory observation unit includes at least one of a concentration meter that measures a mist concentration, a concentration estimating device that estimates a mist concentration based on a facilities operation status in the factory, a door open/closed status detecting device that detects an open/closed status of a door which is installed in the factory, a window open/closed status detecting device that detects an open/closed status of a window which is installed in the factory, and a carry-in entrance shutter open/closed status detecting device that detects an open/closed status of a carry-in entrance shutter which is installed in the factory.

6. The mist removal system according to claim 1, wherein the control unit determines the control details of the interlocking operation based on a sum total of points recorded based on the observation results obtained by the observation unit.

7. The mist removal system according to claim 1, further comprising:
   a recording unit that records the observation results obtained by the observation unit and the control details of the interlocking operation determined by the control unit.

8. The mist removal system according to claim 1, further comprising:
   a monitoring unit that monitors the observation results obtained by the observation unit and the control details of the interlocking operation determined by the control unit.

9. A mist removal method in a mist removal system that observes a mist concentration in an observed region in a factory in which at least one machine tool, which is a mist generation source, is installed and reduces the mist concentration, wherein
   the machine tool includes at least one machine tool mist countermeasure unit that reduces a mist concentration in the machine tool,
   in the factory, at least one factory mist countermeasure unit that reduces a mist concentration in the factory is installed, and the mist removal method comprising steps of:
   observing a situation related to a mist concentration in an arbitrary location in the factory by at least one observation unit;
   determining control details of interlocking operation of the machine tool mist countermeasure unit and the factory mist countermeasure unit based on observation results of a mist concentration obtained by the observation unit; and
reducing the mist concentration in the observed region by controlling the machine tool mist countermeasure unit and the factory mist countermeasure unit based on the control details of the interlocking operation thus determined.

* * * * *